United States Patent

Ryoke et al.

[11] Patent Number: 5,611,826
[45] Date of Patent: Mar. 18, 1997

[54] ABRASIVE TAPE

[75] Inventors: Katsumi Ryoke; Masami Sato; Masaaki Fujiyama, all of Kanagawa-ken, Japan

[73] Assignee: Fuji Photo Film Co., Ltd., Kanagawa, Japan

[21] Appl. No.: 600,886

[22] Filed: Feb. 13, 1996

Related U.S. Application Data

[63] Continuation of Ser. No. 203,564, Mar. 1, 1994, abandoned.

[51] Int. Cl.$^6$ .............................. B24D 11/00; G11B 5/41
[52] U.S. Cl. .............................. 51/295; 51/297; 360/128; 451/539
[58] Field of Search .............................. 51/295, 297; 360/128; 451/526, 539

[56] References Cited

U.S. PATENT DOCUMENTS

| | | | |
|---|---|---|---|
| 3,069,815 | 12/1962 | Valentine | 451/530 |
| 3,266,878 | 8/1966 | Timmer et al. | 51/298 |
| 3,383,191 | 5/1968 | Thomas | 51/298 |
| 3,476,537 | 11/1969 | Markotan | 51/296 |
| 4,138,229 | 2/1979 | Tadokora et al. | 451/530 |
| 4,490,762 | 12/1984 | Akashi et al. | 360/128 |
| 4,652,958 | 3/1987 | Miyoshi et al. | 360/128 |

FOREIGN PATENT DOCUMENTS

| | | | |
|---|---|---|---|
| 56-26890 | 6/1981 | Japan | G11B 5/70 |
| 62-88136 | 4/1987 | Japan | G11B 5/704 |
| 2292179 | 12/1990 | Japan | B24D 11/00 |
| 440156 | 7/1992 | Japan | B24D 11/00 |

*Primary Examiner*—Deborah Jones
*Attorney, Agent, or Firm*—Sughrue, Mion, Zinn, Macpeak & Seas

[57] ABSTRACT

An abrasive tape comprises a flexible substrate and an abrasive layer, which is overlaid on the flexible substrate and which primarily contains fine abrasive grains and a binder resin. The thickness of the flexible substrate falls within the range of 3 μm to 10 μm. The fine abrasive grains of the abrasive layer may contain at least one kind of grains, which have a mean grain diameter falling within the range of 0.05 μm to 20 μm and which are selected from the group consisting of chromium oxide grains, α-alumina grains, silicon carbide grains, non-magnetic iron oxide grains, and diamond grains.

5 Claims, No Drawings

ABRASIVE TAPE

This is a continuation of application Ser. No. 08/203,564 filed Mar. 1, 1994 (abandoned).

BACKGROUND OF THE INVENTION

1. Field of the Invention

This invention relates to an abrasive tape to be used for polishing or cleaning of a magnetic head for a magnetic recording and reproducing apparatus or to be used for polishing, burnishing, texturing, or cleaning of various materials, particularly magnetic recording media. This invention particularly relates to an abrasive tape to be used for rough polishing, finish polishing, or cleaning of a magnetic head for video tape recorders or audio decks.

2. Description of the Prior Art

Video or audio magnetic heads are required to have very smooth tape sliding surfaces and to be free of any foreign substance, such as dust. Therefore, in general, during the process for making the magnetic head, the magnetic head is located at a predetermined position after being roughly polished, and two reels are located with the magnetic head intervening therebetween. In this state, an abrasive tape is moved between the two reels in order to polish the tape sliding surface of the magnetic head. Also, an abrasive tape is incorporated in a cassette and moved therein in order to remove any foreign substance from the tape sliding surface of the magnetic head. In general, the abrasive tape comprises a flexible substrate and a coating layer, which is overlaid on the flexible substrate and primarily contains fine abrasive grains and a binder. It is important for the abrasive tape to be provided with the flexible substrate and to be thereby capable of accurately polishing and smoothing the tape sliding surface of the magnetic head and reliably removing any foreign substance from the tape sliding surface of the magnetic head such that a magnetic tape can snugly fit to and move along the curved surface of the tape sliding surface of the magnetic head.

With the rapid advances made in magnetic tapes capable of recording magnetic information at a high density in recent years, various types of magnetic heads corresponding to the magnetic tapes have heretofore been proposed. Specifically, various magnetic heads, such as thin-film heads, amorphous heads, laminated heads, MIG heads, and MR heads, have been proposed through improvements in the magnetic material and the shape of the magnetic head and have widely been used in practice for high-density recording systems, such as S-VHS system and 8 mm video systems. Also, it has become more important than before that a magnetic head having a small width can be polished to a desired shape and to a smooth finish without being deteriorated, and that foreign substances clinging to a magnetic head can be removed from the magnetic head without the effective depth being decreased.

Further, with the rapid advances made in magnetic recording media capable of recording magnetic information at a high density in recent years, there has arisen a tendency in the magnetic recording medium industry, and the like, toward increased use of thinner magnetic recording media. However, with conventional thin cleaning tapes, a sufficient depth of polishing of the magnetic recording medium cannot be obtained. Moreover, with conventional abrasive tapes, magnetic heads cannot be polished to a shape suitable for thin magnetic tapes.

Furthermore, during the process for polishing a magnetic head, problems have heretofore been encountered in that the magnetic head is deteriorated. This is presumably because, when an abrasive tape slides on and polishes the surface of the magnetic head, heat is generated at the boundary between the surface of the magnetic head and the abrasive tape, and mechanical force is locally applied to the surface of the magnetic head. In particular, in cases where a magnetic head suitable for the recording of magnetic information at a high density is polished, deterioration of the surface of the magnetic head causes the output power of the magnetic recording and reproducing system to decrease markedly.

As a thin abrasive material, an abrasive sheet, which comprises an aromatic polyimide and abrasive grains kneaded therein and has a thickness falling within the range of 5 μm to 200 μm, has been proposed in Japanese Patent Publication No. 4(1992)-40156. However, the proposed abrasive material cannot come into close and uniform contact with a magnetic head and causes uneven wear to occur on the magnetic head. Also, in cases where the proposed abrasive material is used to polish a magnetic head for the recording of magnetic information at a high density, the proposed abrasive material inevitably causes the surface of the magnetic head to deteriorate.

In Japanese Unexamined Patent Publication No. 2(1990)-292179, an abrasive tape is proposed which employs a polyamide resin having a Young's modulus of nor lower than 600 kg/mm$^2$ as a substrate. However, the proposed abrasive tape cannot completely eliminate the problems described above.

SUMMARY OF THE INVENTION

The primary object of the present invention is to provide an abrasive tape, which comes into close and uniform contact with a magnetic head and is capable of polishing the surface of the magnetic head to a desired shape and to a smooth finish without deteriorating the surface of the magnetic head.

Another object of the present invention is to provide an abrasive tape, which polishes a magnetic head such that the polished magnetic head may have a high output power.

The present invention provides an abrasive tape comprising a flexible substrate and an abrasive layer, which is overlaid on the flexible substrate and which primarily contains fine abrasive grains and a binder resin, wherein the thickness of the flexible substrate falls within the range of 3 μm to 10 μm.

The fine abrasive grains of the abrasive layer should preferably contain at least one kind of grains, which have a mean grain diameter falling within the range of 0.05 μm to 20 μm and which are selected from the group consisting of chromium oxide grains, α-alumina grains, silicon carbide grains, non-magnetic iron oxide grains, and diamond grains. In such cases, the objects of the present invention can be accomplished more efficiently.

The flexible substrate employed in the abrasive tape in accordance with the present invention has a thickness falling within the range of 3 μm to 10 μm and is thus thinner than substrates employed in conventional abrasive tapes. Therefore, the abrasive tape in accordance with the present invention can come into close and uniform contact with a magnetic head and can polish the surface of the magnetic head to a smooth finish. Also, the abrasive tape in accordance with the present invention can polish the surface of the magnetic head such that the surface of the magnetic head may not be deteriorated. Further, the abrasive tape in accordance with the present invention can efficiently remove any foreign substance from the magnetic head without the effective depth being decreased. Accordingly, the abrasive tape in accordance with the present invention yields a polished magnetic head having a high output power. The effects of the abrasive tape in accordance with the present invention can be obtained more markedly in cases where the fine abrasive grains in the abrasive layer primarily contain at least one kind of grains, which have a mean grain diameter falling within the range of 0.05 µm to 20 µm and which are selected from the group consisting of chromium oxide grains, α-alumina grains, silicon carbide grains, non-magnetic iron oxide grains, and diamond grains.

The thickness of the flexible substrate of the abrasive tape in accordance with the present invention falls within the range of 3 µm to 10 µm, and should more preferably fall within the range of 4 µm to 8 µm. If the thickness of the flexible substrate is larger than this range, the abrasive tape cannot sufficiently polish the magnetic head. If the thickness of the flexible substrate is smaller than this range, the abrasive tape cannot polish the magnetic head to a desired shape and cannot yield a magnetic head having a high output power.

No limitation is imposed on the thickness of the abrasive layer of the abrasive tape in accordance with the present invention. Ordinarily, the thickness of the abrasive layer falls within the range of 1 µm to 20 µm, and should preferably fall within the range of 2 µm to 5 µm.

As described above, the flexible substrate of the abrasive tape in accordance with the present invention is comparatively thin. Therefore, the Young's modulus of the flexible substrate in either one of the longitudinal direction and the transverse direction should preferably be not lower than 700 kg/mm$^2$, should more preferably be not lower than 800 kg/mm$^2$.

In view of the above, the flexible substrate of the abrasive tape in accordance with the present invention should preferably be constituted of a film selected from the group consisting of a polyethylene naphthalate (PEN) film and a polyamide film. A polyethylene naphthalate can be synthesized from a naphthalene-2,6-dicarboxylic acid dimethyl ester and ethylene. Such a technique is disclosed in, for example, Japanese Unexamined Patent Publication No. 62(1987)-88136. The polyamide film is constituted of a fiber which is known as nylon.

The aforesaid characteristics of the flexible substrate of the abrasive tape in accordance with the present invention ensure that the abrasive tape can have a sufficient depth of polishing and good effects of coming into close and uniform contact with a magnetic head, which effects are equivalent to the effects of a thin magnetic recording medium, and that the abrasive tape can polish a magnetic head to a desired shape and to a smooth finish.

The fine abrasive grains in the abrasive layer of the abrasive tape in accordance with the present invention should preferably contain, primarily, at least one kind of grains, which have a mean grain diameter falling within the range of 0.05 µm to 20 µm and which are selected from the group consisting of chromium oxide grains, α-alumina grains, silicon carbide grains, non-magnetic iron oxide grains, and diamond grains. The mean grain diameter of the fine abrasive grains should more preferably fall within the range of 0.1 µm to 10 µm, and should most preferably fall within the range of 0.1 µm to 8 µm.

If the mean grain diameter of the fine abrasive grains is larger than the aforesaid range, scratches will occur on the surface of the magnetic head during the polishing process, and a polished magnetic head having a high output power cannot be obtained. If the mean grain diameter of the fine abrasive grains is smaller than the aforesaid range, the abrasive tape cannot have a sufficient depth of polishing, and a magnetic head having desired characteristics cannot be obtained.

The proportions of the binder contained in the abrasive layer should preferably fall within the range of 5 to 70 parts by weight per 100 parts by weight of the fine abrasive grains.

With the abrasive tape in accordance with the present invention, a depth of polishing of as large as 0.01 µ to 10 µ can be obtained per 10 seconds when the abrasive tape is brought into contact with a magnetic head and caused to polish the magnetic head. The abrasive tape in accordance with the present invention can polish the magnetic head to a desired shape and to a smooth finish and can remove any foreign substance from the magnetic head without the effective depth being decreased markedly. With the conventional cleaning tape which utilizes magnetic fine grains, such a large depth of polishing could not be obtained.

Such that the coefficient of friction of the abrasive tape in accordance with the present invention with respect to the system for travel of the abrasive tape may be decreased, a backing layer, which comprises a binder and carbon, or the like, dispersed therein, may be overlaid on the back surface of the flexible substrate, which surface is opposite to the surface provided with the abrasive layer.

The fine abrasive grains, which are contained in the abrasive layer (and which may also be contained in the backing layer) of the abrasive tape in accordance with the present invention, should preferably be selected from the materials, which generally have the polishing effects or scratch polishing effects and which are utilized in order to polish magnetic heads efficiently and in order to enhance the effects of cleaning the magnetic heads of video tape recorders. As described above, preferred examples of the fine abrasive grains, which can be employed in the abrasive tape in accordance with the present invention, include chromium oxide grains, α-alumina grains, silicon carbide grains, non-magnetic iron oxide grains, and diamond grains, which have a mean grain diameter falling within the range of 0.05 µm to 20 µm. Other examples of the fine abrasive grains, which can be employed in the abrasive tape in accordance with the present invention, include γ-alumina, α,γ-alumina, fused alumina, cerium oxide, corundum, artificial diamond, garnet, emery (major constituents: corundum and magnetite), silica, silicon nitride, boron nitride, molybdenum carbide, boron carbide, tungsten carbide, titanium carbide, tripoli, diatomaceous earth, and dolomite. The fine abrasive grains should preferably have a Mohs hardness of not less than 6. One of the above-enumerated abrasive grain materials may be used alone, or two to four materials may be used in combination. In cases where the aforesaid other examples of the fine abrasive grains are used together with the aforesaid preferred examples of the fine abrasive grains, the mean grain diameter of the aforesaid other examples the fine abrasive grains should preferably fall within the range of 0.005 µm to 20 µm, and should more preferably fall within the range of 0.01 µm to 10 µm. The fine abrasive grains are utilized as main constituents of the abrasive layer.

In cases where the fine abrasive grains are used in the backing layer, their proportions should preferably fall within the range of 0.01 to 5 parts by weight with respect to 100 parts by weight of a resin, which will be described later. Examples of the fine abrasive grains, which may be contained in the backing layer, include alumina grains AKP1, AKP15, AKP20, AKP30, AKP50, AKP80, Hit50, and Hit100, which are supplied by Sumitomo Chemical Co., Ltd., and chromium oxide grains G5, S3, and S1, which are supplied by Nippon Chemical Industrial Co., Ltd.

The abrasive layer of the abrasive tape in accordance with the present invention may also contain magnetic grains in proportions of not larger than 40% by weight with respect to the amount of the fine abrasive grains. As the magnetic grains, any of known ferromagnetic grains may be employed. Examples of the ferromagnetic grains include $\gamma\text{-Fe}_2\text{O}_3$, Co-containing (Co-adhered, Co-modified, or Co-doped) $\gamma\text{-Fe}_2\text{O}_3$, $\text{Fe}_3\text{O}_4$, Co-containing (Co-adhered, Co-modified, or Co-doped) $\text{Fe}_3\text{O}_4$, $\gamma\text{-FeO}_x$, Co-containing (Co-adhered, Co-modified, or Co-doped) $\gamma\text{-FeO}_x$ (wherein x=1.33 to 1.50), $\text{CrO}_2$, an Fe-Co alloy, a Co-Ni-P alloy, a Co-Ni-Fe-B alloy, an Fe-Ni-Zn alloy, a Ni-Co alloy, and a Co-Ni-Fe alloy.

The magnetic grains may have a size such that the length may fall within the range of approximately 0.005 micron to approximately 1 micron, and the aspect ratio may take a value between approximately $\frac{1}{1}$ and approximately $\frac{50}{1}$. The specific surface area of the magnetic grains may fall within the range of 20 $m^2/g$ to 80 $m^2/g$. As the magnetic grains, it is also possible to use platy hexagonal barium ferrite, modified barium ferrite, and modified strontium ferrite.

As the binder resin contained in the abrasive layer and the backing layer of the abrasive tape in accordance with the present invention, any of binder resins known in the art may be used. These binder resins include thermoplastic resins, thermosetting resins, reactive resins, electron beam-curing resins, ultraviolet-curing resins, visible light-curing resins, and mixtures of two or more of these resins.

The thermoplastic resins, which may be used as the binder resin in the abrasive layer of the abrasive tape in accordance with the present invention, generally have a softening point of 150° C. or lower, an average molecular weight falling within the range of approximately 10,000 to approximately 300,000, and a polymerization degree falling within the range of approximately 50 to approximately 2,000. The polymerization degrees of the thermoplastic resins should preferably fall within the range of approximately 200 to approximately 700. Specifically, as the thermoplastic resin, it is possible to use, for example, a vinyl chloride-vinyl acetate copolymer, a vinyl chloride copolymer, a vinyl chloride-vinyl acetate-vinyl alcohol copolymer, a vinyl chloride-vinyl alcohol copolymer, a vinyl chloride-vinylidene chloride copolymer, a vinyl chloride-acrylonitrile copolymer, an acrylic ester-acrylonitrile copolymer, an acrylic ester-vinylidene chloride copolymer, an acrylic ester-styrene copolymer, a methacrylic ester-acrylonitrile copolymer, a methacrylic ester-vinylidene chloride copolymer, a methacrylic ester-styrene copolymer, a urethane elastomer, a nylon-silicone resin, a nitrocellulose-polyamide resin, polyvinyl fluoride resin, a vinylidene chloride-acrylonitrile copolymer, a butadiene-acrylonitrile copolymer, a polyamide resin, a polyvinyl butyral resin, a cellulose derivative (such as cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, or acetyl cellulose), a styrene-butadiene copolymer, a polyester resin, a polycarbonate resin, a chlorovinyl ether-acrylic ester copolymer, an amino resin, a synthetic rubber type thermoplastic resin, or a mixture of two or more of these compounds.

The thermosetting resins or the reactive resins, which may be used as the binder resin in the abrasive layer of the abrasive tape in accordance with the present invention generally have a molecular weight of 200,000 or less when the resins takes on the form of coating compositions. When the coating compositions are heated and humidified after being applied onto substrates and dried, the resins exhibit an infinite increase in the molecular weight through the condensation reactions, the addition reactions, or the like. It is preferable that the resins of these types do not soften or melt before they decompose thermally. Specifically, the thermosetting resins or the reactive resins include, for example, a phenol resin, a phenoxy resin, an epoxy resin, a polyurethane resin, a polyester resin, a polyurethane polycarbonate resin, a urea resin, a melamine resin, an alkyd resin, a silicone resin, an acrylic reactive resin (an electron beam-curing resin), an epoxy-polyamide resin, a nitrocellulose melamine resin, a mixture of a high-molecular weight polyester resin with an isocyanate prepolymer, a mixture of a methacrylate copolymer with a diisocyanate prepolymer, a mixture of a polyester polyol with a polyisocyanate, a urea-formaldehyde resin, a mixture of a low-molecular weight glycol, a high-molecular weight diol and a triphenylmethane triisocyanate, a polyamine resin, a polyimine resin, and a mixture of two or more of these compounds.

In general, the thermoplastic resins, the thermosetting resins, and the reactive resins described above respectively have their major functional groups, and one to six kinds of other functional groups. Each of the other functional groups should preferably be contained in proportions within the range of $1 \times 10^{-6}$ equivalent to $1 \times 10^{-2}$ equivalent per gram of the resin. Examples of the other functional groups are acid groups, such as a carboxylic acid group (COOM), a sulfinic acid group, a sulfenic acid group, a sulfonic acid group ($SO_3M$), a phosphoric acid group (PO(OM)(OM)), a phosphonic acid group, a sulfuric acid group ($OSO_3M$), and ester groups with these acids, wherein M represents H, an alkali metal, an alkaline earth metal, or a hydrocarbon group; groups of amphoteric compounds, such as a group of an amino acid, a group of an aminosulfonic acid, a group of a sulfuric ester of amino-alcohol, a group of a phosphoric ester of amino-alcohol, a sulfobetaine form group, a phosphobetaine form group, and an alkyl betaine form group; basic groups, such as an amino group, an imino group, an imido group, and an amido group; a hydroxyl group; an alkoxyl group; a thiol group; an alkylthio group; halogen groups, such as F, Cl, Br, and I; a silyl group; a siloxane group; an epoxy group; an isocyanato group; a cyano group; a nitrile group; an oxo group; an acryl group; and a phosphine group.

In the abrasive layer and/or the backing layer of the abrasive tape in accordance with the present invention, polyisocyanates may be contained as hardeners. As the polyisocyanates, it is possible to use, for example, isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. As the polyisocyanates, it is also possible to use products of reactions between the above-enumerated isocyanates and polyalcohols, and dimer to decamer polyisocyanates produced from condensation of isocyanates, and products which are obtained from reactions between polyisocyanates and polyurethanes and which have isocyanate groups as terminal functional groups. The polyisocyanates enumerated above should preferably have an average molecular weight falling within the range of 100 to 20,000. Such polyisocyanates are commercially available as Coronate L, Coronate HL, Coronate 2030, Coronate 2031, Myrionate MR, and Myrionate MTL (supplied by Nippon Polyurethane K.K.); Takenate D-102, Takenate D-110N, Takenate D-200, Takenate D-202, Takenate 300S, and Takenate 500 (supplied by Takeda Chemical Industries, Ltd.); Sumidur T-80, Sumidur 44S, Sumidur PF, Sumidur L, Sumidur N, Desmodur L, Desmodur IL, Desmodur N, Desmodur HL, Desmodur T65, Desmodur 15, Desmodur R, Desmodur RF, Desmodur SL, and Desmodur Z4273 (supplied by Sumitomo Bayer K.K.). These polyisocyanates may be used alone or as a mixture of two or more thereof different in curing reaction properties. In order to promote the curing reaction, compounds having a hydroxyl group (such as butanediol, hexanediol, polyurethane having a molecular weight within the range of 1,000 to 10,000, and water), compounds having an amino group (such as monomethylamine, dimethylamine, and trimethylamine), catalysts, such as metal oxides and iron acetylacetonate, may be used together with the polyisocyanates. The compounds having a hydroxyl group or an amino group should preferably polyfunctional. The proportions of the polyisocyanate used in each of the abrasive layer and the backing layer should preferably fall within the range of 2 to 70 parts by weight per 100 parts by weight of the total of the binder resin and the polyisocyanate, and should more preferably fall within the range of 5 to 50 parts by weight per 100 parts by weight of the total of the binder resin and the polyisocyanate.

Such that the characteristics of the abrasive layer and the backing layer of the abrasive tape in accordance with the present invention may be improved, the abrasive layer and the backing layer may further contain various additives, such as a dispersing agent, a lubricating agent, an antistatic agent, an antioxidant, a mildew-proofing agent, and a coloring agent.

For example, a carbon black may be employed primarily as the antistatic agent. Examples of the carbon black include furnace black for rubber, thermal black for rubber, coloring black, and acetylene black. The carbon black is also used as a light blocking agent, a friction coefficient regulating agent, and a durability improving agent. The carbon black has a mean grain diameter falling within the range of 5 to 1,000 millimicrons (as measured with an electron microscope), a specific surface area falling within the range of 1 $m^2/g$ to 800 $m^2/g$ (as measured with the nitrogen adsorption method), a pH value falling within the range of 4 to 11 (as measured with the JIS K-6221-1982 method), and a dibutyl phthalate (DBP) oil absorption falling within the range of 10 ml/100 g to 800 ml/100 g (as measured with the JIS K-6221-1982 method). In the present invention, in cases where the carbon black is utilized in order to decrease the surface electrical resistance of the coating film, the carbon black having a size falling within the range of 5 to 100 millimicrons is employed. Also, in cases where the carbon black is utilized in order to control the strength of the coating film, the carbon black having a size falling within the range of 50 to 1,000 millimicrons is employed. The kind of the carbon black and the amount of the carbon black added are selected in accordance with the characteristics which the abrasive tape or the cleaning tape is required to have. The carbon black may be subjected to surface treatment with a dispersing agent, which will be described later, or may be grafted with a resin. In cases where the carbon black is employed in the abrasive layer, it should preferably be added in proportions falling within the range of 0.1 to 100 parts by weight per 100 parts by weight of the fine abrasive grains. In cases where the carbon black is employed in the backing layer, it should preferably be added in proportions falling within the range of 20 to 400 parts by weight per 100 parts by weight of a resin which will be described later.

Examples of the antistatic agents other than carbon black, which may be employed in the abrasive tape in accordance with the present invention, include conductive grains, such as graphite grains, modified graphite grains, carbon black graft polymer grains, tin oxide-antimony oxide grains, tin oxide grains, and titanium oxide-tin oxide-antimony oxide grains; natural surface active agents, such as saponin; nonionic surface active agents, such as an alkyleneoxide compound, a glycerin compound, a glycidol compound, a polyhydric alcohol, a polyhydric alcohol ester, and an adduct of an alkyl phenol with ethylene oxide; cationic surface active agents, such as a higher alkylamine, a cyclic amine, a hydantoin derivative, an amidoamine, an ester amide, a quaternary ammonium salt, a heterocyclic compound, e.g. pyridine, a phosphonium compound, and a sulfonium compound; anionic surface active agents containing acidic groups, such as a carboxylic acid group, a sulfonic acid group, a phosphonic acid group, a phosphoric acid group, a sulfuric ester group, a phosphonic ester group, and a phosphoric ester group; and amphoteric surface active agents, such as an amino acid, an amino sulfonic acid, a sulfate or a phosphate of an amino alcohol, and an alkyl betaine compound. In cases where the surface active agent is employed in the abrasive layer, it may be added in proportions falling within the range of 0.01 to 10 parts by weight per 100 parts by weight of the fine grain constituents. In cases where the surface active agent is employed in the backing layer, it may be added in proportions falling within the range of 0.01 to 30 parts by weight per 100 parts by weight of the binder. The surface active agents may also be used for purposes other than as the antistatic agents, for example, for dispersion, for improvement of magnetic characteristics, for improvement of lubricating properties, as coating assisting auxiliaries, as wetting agents, as hardening accelerators, and as dispersion accelerators.

Examples of the lubricating agents, which may be employed in the abrasive layer and the backing layer of the abrasive tape in accordance with the present invention, include fine grains of inorganic materials, such as graphite, molybdenum disulfide, boron nitride, graphite fluoride, calcium carbonate, barium sulfate, silicon oxide, titanium oxide, zinc oxide, tin oxide, and tungsten disulfide; and fine grains of resins, such as an acryl-styrene resin, a benzoguanamine resin, a melamine resin, a polyolefin resin, a polyester resin, a polyamide resin, a polyimide resin, and a polyfluoroethylene resin.

As the lubricating agents, various organic compounds may also be employed. Examples of such organic compounds include compounds into which fluorine or silicon is introduced, such as a silicone oil (e.g., a dialkyl polysiloxane, a dialkoxy polysiloxane, a phenyl polysiloxane, or a fluoroalkyl polysiloxane, which is supplied as KF96, KF69, or the like, by Shin-Etsu Chemical Co., Ltd.), a fatty acid-modified silicone oil, a fluorine alcohol, a polyolefin (e.g., a polyethylene wax or a polypropylene), a polyglycol (e.g., ethylene glycol or a polyethylene oxide wax), a tetrafluoroethylene oxide wax, a polytetrafluoroglycol, a perfluoroalkyl ether, a perfluorofatty acid, a perfluorofatty acid ester, a perfluoroalkylsulfuric ester, a perfluoroalkylsulfonic ester, a perfluoroalkylbenzenesulfonic ester, and a perfluoroalkylphosphoric ester; organic acids and organic acid ester compounds, such as an alkylsulfuric ester, an alkylsulfonic ester, an alkylphosphonic triester, an alkylphosphonic monoester, an alkylphosphonic diester, an alkylphosphoric ester, and a succinic ester; heterocyclic compounds containing nitrogen or sulfur, such as triazaindolizine, tetraazaindene, benzotriazole, benzotriazinc, benzodiazole, and EDTA; a fatty acid ester of a monobasic fatty acid having 10 to 40 carbon atoms with at least one or two of a monohydric alcohol, a dihydric alcohol, a trihydric alcohol, a tetrahydric alcohol and a hexahydric alcohol having 2 to 40 carbon atoms; a fatty acid ester of a monobasic fatty acid having at least 10 carbon atoms with such an monohydric, dihydric, trihydric, tetrahydric, pentahydric or hexahydric alcohol that the sum of the number of the carbon atoms of the fatty acid and the number of the carbon atoms of the alcohol falls within the range of 11 to 70; and fatty acids, fatty acid amides, fatty acid alkyl amides, and aliphatic alcohols having 8 to 40 carbon atoms. Such an organic compound lubricating agent may, for example, be butyl caprylate, octyl caprylate, ethyl laurate, butyl laurate, octyl laurate, ethyl myristate, octyl myristate, 2-ethylhexyl myristate, ethyl palmitate, butyl palmitate, octyl palmitate, 2-ethylhexyl palmitate, ethyl stearate, butyl stearate, isobutyl stearate, octyl stearate, 2-ethylhexyl stearate, amyl stearate, isoamyl stearate, 2-ethylpentyl stearate, 2hexyldecyl stearate, isotridecyl stearate, stearic acid amide, stearic acid alkyl amide, butoxyethyl stearate, anhydrosorbitan monostearate, anhydrosorbitan distearate, anhydrosorbitan tristearate, anhydrosorbitan tetrastearate, oleyl alcohol, lauryl alcohol, montan wax, or carnauba wax.

As the dispersing agents and dispersion assisting auxiliaries, it is possible to employ fatty acids having 2 to 40 carbon atoms ($R_1COOH$, wherein $R_1$ represents an alkyl group, a phenyl group, or an aralkyl group, which has 1 to 39 carbon atoms), such as caprylic acid, capric acid, lauric acid, myristic acid, palmitic acid, stearic acid, oleic acid, elaidic acid, linoleic acid, linolenic acid, stearolic acid, behenic acid, maleic acid, and phthalic acid; metallic soaps (e.g., copper oleate) obtained from the above-enumerated fatty acids and alkali metals (Li, Na, K, and the like), alkaline earth metals (Mg, Ca, Ba, and the like), Cu, or Pb; fatty acid amides; and lecithins (e.g., soybean oil lecithin). As the dispersing agents and dispersion assisting auxiliaries, it is also possible to employ higher alcohols having 4 to 40 carbon atoms (e.g., butyl alcohol, octyl alcohol, myristyl alcohol, and stearyl alcohol), sulfuric esters of these higher alcohols, sulfonic acid, phenylsulfonic acids, alkylsulfonic acids, sulfonic esters, phosphoric monoesters, phosphoric diesters, phosphoric triesters, alkylphosphonic acids, phenylphosphonic acids, and amine compounds. As the dispersing agents and dispersion assisting auxiliaries, it is further possible to employ polyethylene glycols, polyethylene oxides, sulfosuccinic acid, sulfosuccinic acid metal salts, and sulfosuccinic esters. Ordinarily, one or more kinds of the dispersing agents are employed. One kind of the dispersing agent is added in proportions falling within the range of 0.005 to 20 parts by weight per 100 parts by weight of the binder. When the dispersing agent is used, it may be adhered to the surfaces of the fine abrasive grains or may be added during the dispersion process.

Examples of the mildew-proofing agents, which may be employed in the abrasive tape in accordance with the present invention, include 2-(4-thiazolyl)benzimidazole, N-(fluorodichloromethylthio)-phthalimide, 10,10'-oxybisphenoxarsine, 2,4,5,6-tetrachloroisophthalonitrile, p-tolyldiiodomethylsulfone, triiodoallyl alcohol, dihydroacetic acid, mercury phenyloleate, bis(tributyltin) oxide, and salicylanilide.

The abrasive layer and the backing layer of the abrasive tape in accordance with the present invention may further contain antioxidants (e.g., metal chelating agents, such as an alkyl phenol, benzotriazine, tetraazaindene, sulfamide, guanidine, nucleic acid, pyridine, amine, hydroquinone, and EDTA), rust preventives (e.g., naphthenic acid, alkenylsuccinic acid, and dilauryl phosphate), oiliness improvers (e.g., colza oil and lauryl alcohol), extreme pressure additives (e.g., dibenzyl sulfide, tricresyl phosphate, and tributyl phosphite), detergent-dispersants, viscosity index improvers, pour point depressants, and foaming preventives. These additives are added in proportions falling within the range of 0.01 to 30 parts by weight per 100 parts by weight of the binder.

In the present invention, organic solvents may be used in any proportion during the dispersing, kneading, and coating processes for the coating composition which is used to form the abrasive layer. Examples of such organic solvents include ketones, such as acetone, methyl ethyl ketone, methyl isobutyl ketone, cyclohexanone, isophorone, and tetrahydrofuran; alcohols, such as methyl alcohol, ethyl alcohol, propyl alcohol, butyl alcohol, isobutyl alcohol, isopropyl alcohol, and methylcyclohexanol; esters, such as methyl acetate, ethyl acetate, butyl acetate, isobutyl acetate, isopropyl acetate, ethyl lactate, and glycol acetate monoethyl ether; ethers, such as diethyl ether, tetrahydrofuran, ethylene glycol dimethyl ether, ethylene glycol monoethyl ether, and dioxane; aromatic hydrocarbons, such as benzene, toluene, xylene, cresol, chlorobenzene, and styrene; chlorinated hydrocarbons, such as methylene chloride, ethylene chloride, carbon tetrachloride, chloroform, ethylene chlorohydrin, and dichlorobenzene; N,N-dimethylformamide, and hexane. Ordinarily, two or more of the above-enumerated organic solvents are used in combination in arbitrary proportions. The organic solvents may contain small amounts of impurities (e.g., polymerization products of the organic solvents, moisture, and raw material constituents of the organic solvents) in proportions of not larger than 1% by weight. Ordinarily, the organic solvents are used in proportions falling within the range of 100 to 20,000 parts by weight per 100 parts by weight of the total solids of the coating composition for the abrasive layer, or the coating composition for the backing layer, or the prime-coating composition.

The solid contents of the coating composition should preferably fall within the range of 1% by weight to 40% by weight. The solid contents of the coating composition for the backing layer should preferably fall within the range of 1% by weight to 20% by weight. An aqueous solvent may be employed in lieu of the organic solvents.

When the abrasive layer is to be formed, the constituents described above are selected appropriately and dispersed or dissolved in the organic solvents, and a coating composition is thereby prepared. The coating composition is applied onto the flexible substrate and dried. If necessary, the coating composition is subjected to an orientation process. Examples of the materials for the flexible substrate include polyesters, such as a polyethylene terephthalate and a polyethylene naphthalate; polyolefins, such as a polypropylene; cellulose derivatives, such as cellulose triacetate and cellulose diacetate; vinyl resins, such as a polyvinyl chloride; plastic materials, such as a polycarbonate, a polyimide, a polyamide, a polysulfone, a polyphenylsulfone, and a polybenzoxazole; metals, such as aluminum and copper; and ceramic materials, such as glass. Among the above-enumerated materials, the polyethylene naphthalate and the polyamide are preferable. Before the coating composition is applied onto the flexible substrate, the flexible substrate may be subjected to corona discharge treatment, plasma treatment, prime-coating treatment, heat treatment, dust-resistant treatment, metal vapor evaporation treatment, and/or alkali treatment.

No limitation is imposed on how the dispersion and kneading processes are carried out. The order, in which the constituents (the resins, the grains, the lubricants, the solvents, and the like) are added, the timing, with which the constituents are added during the dispersion and kneading processes, the temperature at which the dispersion process is carried out (and which will ordinarily fall within the range of 0° C. to 80° C.), and the like, may be selected appropriately. One of various types of kneading machines may be used in order to prepare the coating composition for the abrasive layer and the coating composition for the backing layer. For example, it is possible to use a twin roll mill, a triple roll mill, a ball mill, a pebble mill, a trommel, a sand grinder, a Szegvari attritor, a high-speed impeller dispersing machine, a high-speed stone mill, a high-speed impact mill, a disperser, a kneader, a high-speed mixer, a ribbon blender, a Ko-kneader, an intensive mixer, a tumbler, a blender, a homogenizer, a single-screw extruder, a twin-screw extruder, or an ultrasonic dispersing machine.

When the coating composition for the abrasive layer and the coating composition for the backing layer are to be applied onto the flexible substrate, the viscosity of each coating composition may be adjusted at a value falling within the range of 1 to 20,000 centistrokes at 25° C. Each coating composition may be applied onto the flexible substrate by using any of coating apparatuses, for example, an air doctor coater, a blade coater, an air-knife coater, a squeeze coater, an impregnation coater, a reverse-roll coater, a transfer roll coater, a gravure coater, a kiss-roll coater, a cast coater, a spray coater, a rod coater, a forward-rotation roll coater, a curtain coater, an extrusion coater, a bar coater, or a lip coater.

An abrasive tape web, which has been prepared in the manner described above, is cut into abrasive tapes, and each abrasive tape is wound around a desired plastic or metal reel. Before or immediately before the abrasive tape is round around the reel, the abrasive tape (specifically, the abrasive layer surface, the backing layer surface, the edge surfaces, and/or the base surface on the back side) should preferably be burnished and/cleaned. The burnishing process is carried out in order to adjust the surface roughness and the polishing performance of the abrasive tape. Specifically, protrusions on the surface of the abrasive tape are scraped out, and the surface of the abrasive tape is thereby made uniform or smooth by using a hard material, such as a sapphire blade, a shaving blade, a hard material blade, a diamond blade, or a ceramic blade. No limitation is imposed on the hardness of the material used for the burnishing process, and any of materials, which can remove protrusions on the surface of the abrasive tape, may be employed. However, the Mohs hardness of the material used for the burnishing process should preferably be 8 or higher. The materials need not necessarily take on the form of blades and may have other shapes, such as square, round, and wheel shapes. (The material may be provided on the circumferential surface of a rotatable cylinder.) The cleaning process is carried out in order to remove foreign substances, excessive lubricating agents, and the like, from the surface of the abrasive tape. For this purpose, the abrasive layer surface, the backing layer surface, the edge surfaces, and the base surface on the back side are wiped with a nonwoven fabric, or the like. As the wiping materials, it is possible to use, for example, various Vilene products supplied by Japan Vilene Co., Ltd., Toraysee and Ecsaine supplied by Toray Industries, Inc., a material available as Kimwipe (trade name), a nylon unwoven fabric, a polyester unwoven fabric, a rayon unwoven fabric, an acrylonitrile unwoven fabric, a mixed unwoven fabric, and tissue paper.

As for the fine abrasive grains, the magnetic grains, the non-magnetic grains, the binders, the additives (such as lubricating agents, dispersing agents, antistatic agents, surface treatment agents, carbon black, light blocking agents, antioxidants, and mildew-proofing agents), the solvents, and/or substrates (which may be provided with a prime-coating layer, a backing layer, and a back prime-coating layer), which may be utilized for the abrasive tape in accordance with the present invention, and how to prepare these constituents, reference may be made to, for example, the method for making a magnetic recording medium, which is disclosed in Japanese Patent Publication No. 56(1981)-26890.

The present invention will further be illustrated by the following non-limitative examples. In these examples, the term "parts" means parts by weight.

EXAMPLES 1 THROUGH 7 AND COMPARATIVE EXAMPLES 1, 2, 3

A prime-coating layer constituted of a polyester polyurethane resin was applied to a thickness of 0.1 µm onto each of various flexible substrates listed in Table 1 below. An abrasive coating composition was prepared from the constituents described below and applied with a bar coating process onto the prime-coating layer such that the dry thickness of the abrasive layer might be 3 µm. In this manner, various samples of abrasive tapes were prepared.

Abrasive coating composition:

| | |
|---|---|
| Abrasive grains (α-alumina) (granular, mean grain diameter: 0.5 µm, Mohs hardness: 9) | 95 parts |
| Abrasive grains (diamond) (granular, mean grain diameter: 0.8 µm, Mohs hardness: 10) | 5 parts |
| Binder (vinyl chloride-vinyl acetate resin) (400X, epoxy group: $1 \times 10^{-5}$ equivalent per g of the resin) | 3 parts |
| Binder (polyurethane resin) (containing sodium sulfonate in a proportion of $2 \times 10^{-3}$ equivalent per g of the resin, Mw: 70,000) | 6 parts |
| Binder (polyisocyanate) (a reaction product of 3 mols of tolylene diisocyanate with 1 mol of trimethylolpropane) | 2 parts |
| Lubricating agent (oleic acid) | 0.1 part |
| Lubricating agent (dodecyl polyethylene glycol) (repetitions: 10) | 0.1 part |
| Diluting agent (methyl ethyl ketone/cyclohexanone = 2/1) | 200 parts |
| Diluting agent (toluene/MIBK) | 150 parts |

Thereafter, magnetic heads (MIG type heads) for 8 mm video tape recorders were polished for approximately 20 seconds by using each of the prepared abrasive tapes. Each of the polished magnetic head was set in an 8 mm video tape recorder (EV-BS3000 supplied by Sony Corp., and the output power was investigated by using an 8 mm tape supplied by Fuji Photo Film Co., Ltd. The results shown in Table 1 were obtained.

The results shown in Table 1 revealed that, in cases where abrasive tapes having a PEN or aramid base and having a thickness falling within the range of 3 µm to m were used for the polishing process, the polished magnetic heads yielded a high output power.

As the output power, the reproduction output power at a 4MHz single frequency was measured.

TABLE 1

| | Substrate | | | Output (dB) |
|---|---|---|---|---|
| | Material | Thickness (μm) | Young's modulus (Kg/mm$^2$) | |
| Example 1 | PEN | 5 | 800 | 700 | +2.0 |
| Example 2 | PEN | 5 | 1100 | 550 | +1.5 |
| Example 3 | PEN | 5 | 500 | 1100 | +2.1 |
| Example 4 | PEN | 9 | 800 | 700 | +1.6 |
| Comp. Ex 1 | PEN | 12 | 800 | 700 | +0.2 |
| Comp. Ex 5 | Aramid | 4 | 1000 | 900 | +2.3 |
| Comp. Ex 6 | PET | 8 | 400 | 400 | +0.7 |
| Comp. Ex 2 | PET | 12 | 400 | 400 | −0.6 |
| Comp. Ex 3 | PET | 30 | 400 | 400 | −0.2 |
| Comp. Ex 7 | PET | 5 | 600 | 400 | +0.6 |

What is claimed is:

1. An abrasive tape comprising an abrasive layer overlaid on a flexible substrate, wherein said abrasive layer primarily contains fine abrasive grains and a binder resin, and wherein:

the flexible substrate has a thickness within the range of 4 μm to 8 μm;

said fine abrasive grains contain at least one member selected from the group consisting of chromium oxide grains, α-alumina grains, silicon carbide grains, non-magnetic iron oxide grains, and diamond grains;

said fine abrasive grains have a mean grain diameter of from 0.1 μm to 10 μm; and said fine abrasive grains further contain magnetic grains in an amount of 0–40% by weight of said at least one member.

2. An abrasive tape as defined in claim 1, wherein the flexible substrate in either one of the longitudinal direction and the transverse direction has a Young's modulus of not lower than 700 kg/mm$^2$.

3. An abrasive tape as defined in claim 2, wherein the flexible substrate in either one of the longitudinal direction and the transverse direction has a Young's modulus of not lower than 800 kg/mm$^2$.

4. An abrasive tape as defined in any of claims 1, 2 and 3 wherein the flexible substrate is a film selected from the group consisting of a polyethylene naphthalate film and a polyamide film.

5. An abrasive tape as defined in claim 1, wherein said binder resin is contained in the abrasive layer in an amount of 5 to 70 parts by weight per 100 parts by weight of said fine abrasive grains.

* * * * *